(12) United States Patent
Rink et al.

(10) Patent No.: US 6,233,908 B1
(45) Date of Patent: *May 22, 2001

(54) METHOD OF INTRODUCING A LEAK TRACE MATERIAL INTO AN AIRBAG INFLATOR

(75) Inventors: Karl K. Rink, Liberty; David J. Green; Anthony M. Young, both of Brigham City, all of UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/220,431

(22) Filed: Dec. 24, 1998

(51) Int. Cl.[7] .............................. B65B 63/08; B60R 21/26
(52) U.S. Cl. .................................. 53/440; 53/79; 53/127; 53/403; 73/40.7; 73/49.3; 141/3; 250/303; 280/741
(58) Field of Search .......................... 280/741, 736; 73/40, 49.3, 40.7; 141/3, 4, 18; 53/403, 404, 79, 80, 84, 428, 440, 111 R, 127; 250/302, 303

(56) References Cited

U.S. PATENT DOCUMENTS

| | | |
|---|---|---|
| 651,132 | 6/1900 | Davis . |
| 1,056,560 | 3/1913 | Lippincott . |
| 1,805,721 | 5/1931 | Kogl . |
| 2,334,211 | 11/1943 | Miller . |
| 2,403,932 | 7/1946 | Lawson . |
| 2,995,987 | 8/1961 | Fitzpatrick . |
| 3,597,611 * | 8/1971 | Harman et al. .................... 250/303 |
| 3,649,096 * | 3/1972 | Clark et al. ........................ 250/303 |
| 3,664,134 | 5/1972 | Seitz . |
| 3,674,059 | 7/1972 | Stephenson . |
| 3,809,898 * | 5/1974 | Fries ................................... 250/303 |
| 3,862,866 | 1/1975 | Timmerman et al. . |
| 3,869,610 * | 3/1975 | Durigon et al. .................... 250/303 |
| 3,884,497 | 5/1975 | Massengill et al. . |
| 3,958,949 | 5/1976 | Plantif et al. . |
| 3,964,256 | 6/1976 | Plantif et al. . |
| 3,986,456 | 10/1976 | Doin et al. . |
| 4,050,483 | 9/1977 | Bishop . |
| 5,001,343 * | 3/1991 | Gnade et al. ...................... 250/303 |
| 5,031,932 | 7/1991 | Frantom et al. . |
| 5,060,973 | 10/1991 | Giovanetti . |
| 5,076,607 | 12/1991 | Woods et al. . |
| 5,171,385 | 12/1992 | Michels et al. . |
| 5,230,531 | 7/1993 | Hamilton et al. . |

(List continued on next page.)

FOREIGN PATENT DOCUMENTS

| | | |
|---|---|---|
| 43 03 169 | 4/1994 | (DE) . |
| 0 757 975 | 2/1997 | (EP) . |
| 211442 | 6/1972 | (FR) . |
| 56088804 | 7/1981 | (JP) . |

OTHER PUBLICATIONS

*Radioflo Theory Training Manual*, by Iso Vac Engineering, Inc., pp. T–1 through T–27, Jan. 1997.

George Neff and Jimmie Neff: *Leak Testing Electronic Devices in Production Quantities*, Microelectronic Manufacturing and Testing, Sep. 1986.

Klaus W. Geiger, Janet S. Merritt and John G.V. Taylor: *New Branching Ratio for $Kr^{85}$*, Nucleonics, Jan. 1961.

Isovac Engineering, Inc. History & Background, 2 pages, undated.

*Primary Examiner*—Stephen F. Gerrity
(74) *Attorney, Agent, or Firm*—Sally J. Brown

(57) ABSTRACT

A method for introducing a radioactive leak trace material into an apparatus for inflating an inflatable device is disclosed in which a mixture containing a preselected quantity of the radioactive leak trace material and a quantity of at least one gas source material, which upon initiation results in an inflation fluid used to inflate the device, are loaded into a chamber of the apparatus.

21 Claims, 1 Drawing Sheet

U.S. PATENT DOCUMENTS

| | | |
|---|---|---|
| 5,330,730 | 7/1994 | Brede et al. . |
| 5,348,344 | 9/1994 | Blumenthal et al. . |
| 5,428,988 | 7/1995 | Starkovich . |
| 5,452,661 | 9/1995 | Neff . |
| 5,464,248 | 11/1995 | Sasaki et al. . |
| 5,466,313 | 11/1995 | Brede et al. . |
| 5,470,104 | 11/1995 | Smith et al. . |
| 5,494,312 | 2/1996 | Rink . |
| 5,504,288 | 4/1996 | Morin . |
| 5,531,473 | 7/1996 | Rink et al. . |
| 5,536,339 | 7/1996 | Verneker . |
| 5,580,086 | 12/1996 | McAlister . |
| 5,582,806 | 12/1996 | Skanberg et al. . |
| 5,669,629 | 9/1997 | Rink . |
| 5,673,933 * | 10/1997 | Miller et al. ............... 53/403 |
| 5,845,461 * | 12/1998 | Miller, II et al. ............ 53/403 |
| 5,884,938 * | 3/1999 | Rink et al. ............... 280/741 |
| 5,897,137 * | 4/1999 | Al-Amin et al. ............. 280/741 |
| 5,929,367 * | 7/1999 | Neff et al. ............... 73/49.3 |
| 5,941,562 * | 8/1999 | Rink et al. ............... 280/741 |
| 6,117,254 * | 9/2000 | Rink et al. ............... 149/35 |
| 6,170,867 * | 1/2001 | Rink et al. ............... 280/741 |

* cited by examiner

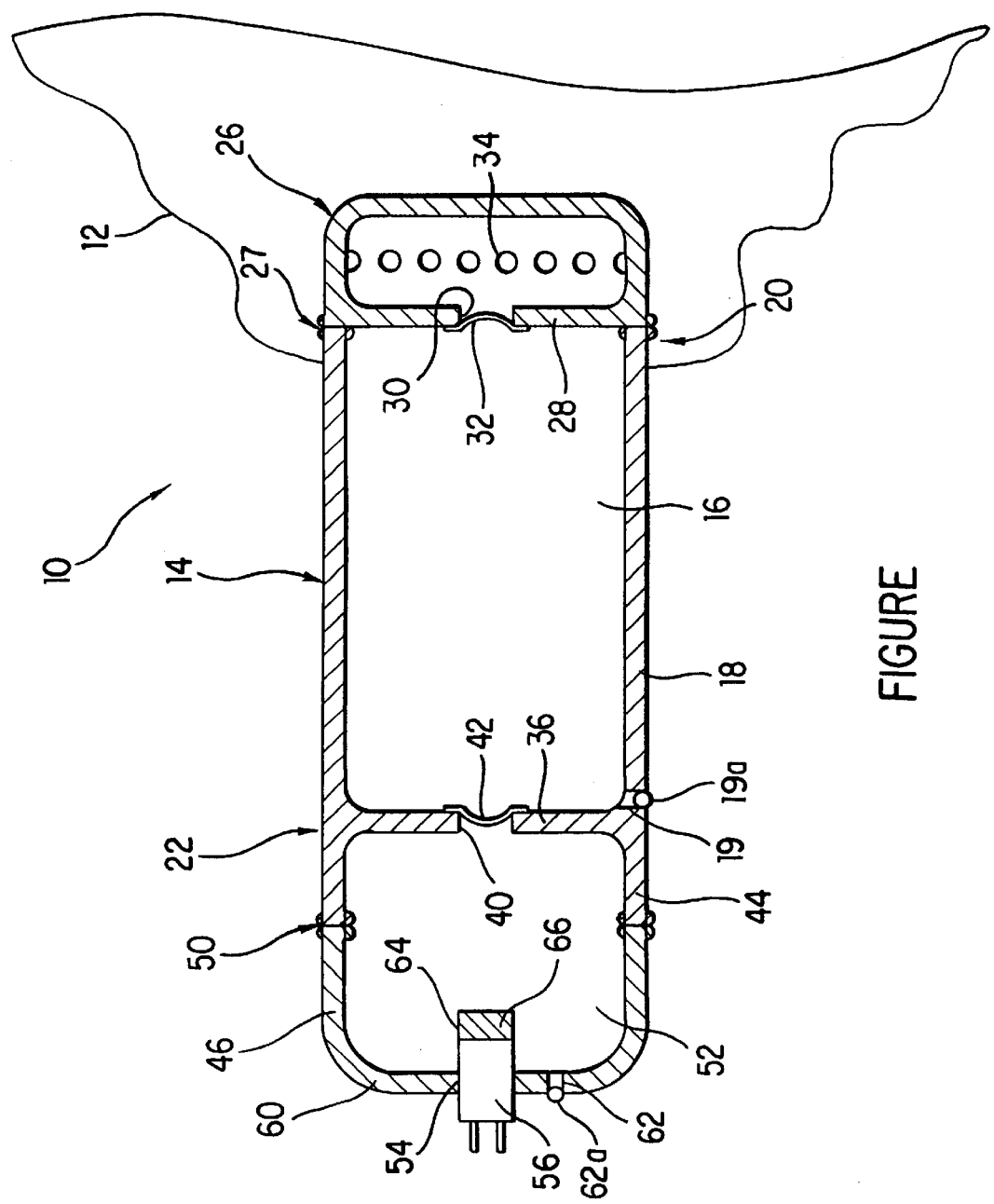
FIGURE

METHOD OF INTRODUCING A LEAK TRACE MATERIAL INTO AN AIRBAG INFLATOR

CROSS REFERENCE TO RELATED APPLICATIONS

The subject matter of this application is related to prior, currently pending U.S. patent applications Ser. No. 08/935,014 (now Rink et al., U.S. Pat. No. 5,941,562, issued Aug. 24, 1999) and Ser. No. 08/935,016, (now Rink et. al., U.S. Pat. No. 5,884,938, issued Mar. 23, 1999) each respectively filed on Sep. 22, 1997 as a continuation-in-part application of application U.S. Ser. No. 08/632,698, filed on Apr. 15, 1996, now Rink, U.S. Pat. No. 5,669,629, issued Sep. 23, 1997; Ser. No. 09/005,274, filed on Jan. 9, 1998; and Ser. No. 09/027,020, filed on Feb. 20, 1998 now Rink et al., U.S. Pat. No. 6,117,254, issued Sep. 12, 2000. The disclosures of each and every of these prior applications are hereby incorporated by reference herein and made a part hereof, including but not limited to those portions which specifically appear hereinafter.

BACKGROUND OF THE INVENTION

This invention relates generally to pressurized fluid-containing devices such as used in the inflation of inflatable devices such as inflatable vehicle occupant restraint airbag cushions and, more particularly, to the introduction of a leak trace material, particularly a radioactive leak trace material, into such pressurized fluid-containing devices.

It is well known to protect a vehicle occupant using a cushion or bag, e.g., an "airbag cushion," that is inflated or expanded with gas when the vehicle encounters sudden deceleration, such as in the event of a collision. In such systems, the airbag cushion is normally housed in an uninflated and folded condition to minimize space requirements. Upon actuation of the system, the cushion begins to be inflated in a matter of no more than a few milliseconds with gas produced or supplied by a device commonly referred to as an "inflator."

The above-referenced prior U.S. patent application Ser. No. 08/935,016 relates that various inflator devices have been disclosed in the art and that it is common for various such inflator devices, or at least particular components thereof, to be checked for the presence or occurrence of undesired leaks. In particular, one category of inflator devices is often referred to as "compressed gas inflators" and refers to various inflators which contain compressed gas. One type of compressed gas inflator, commonly referred to as a "stored gas inflator," simply contains a quantity of a stored compressed gas which is selectively released to inflate an associated airbag cushion. In a second type of compressed gas inflator, commonly referred to as a hybrid inflator, inflation gas results from a combination of stored compressed gas and the combustion of a gas generating material, e.g., a pyrotechnic.

Compressed gas inflators commonly require the presence of at least certain specified quantities of the particular compressed gas material in order for the inflator to perform in the designed for manner. In such inflators, it is generally desired that the amount(s) of stored compressed material(s) be maintained in the inflator within at least a certain specified tolerance in order to ensure proper operation of the inflator. While proper inflator operation can be variously defined, ultimately an inflator and associated airbag cushion need provide adequate vehicle occupant protection over an extended period of time (typically 15 years or more) subsequent to original construction and installation in a particular vehicle. Thus, beyond the simple functioning of the inflator and deployment of an associated airbag cushion, such inflatable restraint systems desirably operate or function in a manner wherein the airbag cushion will deploy, when needed, in the desired and proper manner.

While there are various methods to determine the rate of leakage from a compressed gas inflator, in practice, a typically preferred method relies on the incorporation of helium as a tracer gas in the particular compressed gas mixture. In such a method, helium will constitute a certain fraction of the stored gas composition which escapes from the inflator. (As will be appreciated and dependent on the specific situation, the exact fraction of helium detected as a result of a leak may be equal, less than, or greater than the helium fraction of the stored compressed gas. The physics associated with these various situations, however, is generally beyond the scope of the present discussion. Typically, however, these different situations are dependent on certain, particular factors such as the magnitude of the leak, the total pressure within the storage vessel, as well as the initial gas composition, for example.)

The rate of helium leakage from a pressure vessel is normally detected using a mass spectrometer system. For this specific practice, the mass spectrometer is normally calibrated or designed to detect the presence of helium in the gases constituting the sample. The utilization of helium as a leak trace material is advantageous in several respects:

First, as the normal or typical atmospheric content of helium is rather low, the background helium level (or residual helium in the environment such as that surrounding the detection apparatus) is normally correspondingly low. As a result, the possibility of a corresponding mass spectrometer being falsely influenced and possibly producing a spurious signal is significantly reduced or minimized.

Second, the signals of a mass spectrometer for at least certain different molecular species can be nearly the same. Consequently, a mass spectrometry signal produced or resulting from the presence or occurrence of one molecular species may interfere or mask a mass spectrometer signal produced or resulting from the presence or occurrence of a different molecular species. For example, the molecular weights of nitrous oxide and carbon dioxide are approximately 44.02 and 44.01, respectively. As a result, it is generally very difficult to distinguish between these molecular species via mass spectrometry. Helium, however, with a molecular weight of 4, produces a mass spectrometry signal that is relatively easily distinguishable from the signal correspondingly produced by other potentially present species.

Third, helium is a relatively small, low molecular weight monatomic gas, facilitating the passage thereof through even relatively small or narrow leak paths. Thus, such use of helium may facilitate or better permit detection of even relatively small or narrow leak paths.

Conventional helium leak detection techniques may, however, suffer or potentially suffer from a number of problems or possible disadvantages. For example, in order to permit a leak check or determination of the relatively small range of leakage which may normally be acceptable for commercial airbag inflator devices, it is commonly necessary to include a relatively large amount of helium in the associated compressed gas mixture. In practice, the amount of helium required is generally dependent on factors such as the magnitude and type of leak, the design life of the inflator, and the criteria for adequate performance for the inflator as a function of time. However, the incorporation of even moderate amounts of helium within a compressed gas inflator is or can be disadvantageous as such inclusion can, for a given volume, significantly increase the storage pressure of the corresponding inflator contents. Conversely, at a given pressure, the storage volume of an inflator will need to be increased in order to accommodate the mass of the so added helium.

A significant limitation on the use of helium in such leak detection schemes is that unless the helium concentration within the vessel is known, the leak rate from an inflator pressure vessel normally cannot be accurately checked at a date substantially later than the date the inflator was manufactured. That is, unless the leak is of the type that the compressed gases (e.g., both the primary stored gas and the helium tracer gas) are escaping in equal proportion to that at which they were loaded (as in the original composition), then the leak rate determination will normally be in error. Since knowledge of the type of leak cannot be definitively known a priori, the making of such an assumption can result in significant error. Moreover, if a pressurized vessel is returned at a later date for the leak rate to be reevaluated, a helium leak rate determination may be inaccurate.

An additional possible limitation or drawback to the use of such helium leak detection techniques is that the occurrence or presence of liquid materials within the storage vessel may impede or "mask" the helium. For example, if a liquid with a relatively high surface tension is present in the vessel, such liquid could possibly flow into a hole through which gas would normally leak and may, at least temporarily, inhibit the passage of the gaseous material out of the inflator. However, with time, the liquid may no longer occupy the leak path and the stoppage of gas leakage therethrough may only be temporary.

In addition, though helium is relatively rare in the general atmosphere, it will be appreciated that relatively high background concentrations of helium can be created in manufacturing environments. This may necessitate that a vessel being tested be isolated such as by being placed in a closed chamber in which a vacuum is created in the surrounding environment, with the helium leak rate then being determined. Such special handling can significantly increase the time and expense associated with the manufacturing process.

Further, the use of and reliance on such helium leak detection techniques may undesirably result in the addition of considerable expense to the cost of the inflator, both through the inherent cost of helium and the cost of purchasing and maintaining the mass spectrometers, as well as the costs associated with the equipment required to store, mix, and handle the helium.

Thus, there is a need and a demand for a pressurized fluid-containing inflator design which facilitates leak detection. To that end, the above-referenced prior U.S. patent application Ser. No. 08/935,016 discloses the development of a method for the detection of the occurrence of a leak from an otherwise closed chamber which contains a pressurized fluid. In accordance with one such method, a selected quantity of at least one radioactive isotope leak trace material is included within the particular inflator chamber. The detection of the occurrence of a leak from the chamber is done by measuring the reduction or change in the radioactive signals emanating from the chamber.

As disclosed therein, such methods may provide a convenient and accurate means by which to leak check associated or corresponding pressurized, fluid-containing chambers or vessels, such as may be included in an airbag inflator. Further, such methods may correct problems and alleviate disadvantages, both actual and potential, which are inherent in the common application of helium as a leak detection material; including, for example, the increased size, weight and cost of such inflators as well as the increased manufacturing, equipment and personnel costs and expenses such as may be associated with the application of helium as a leak detection material. Still further, such invention may provide for the avoidance or minimization of possible leak paths from such pressure vessels, particularly pressurized fluid-containing airbag inflators. Yet still further, such invention may provide an apparatus and method wherein a material used to accomplish a leak check can, if desired, be directly included with a fuel source, such as to aid or assist in dissociation. Yet still even further, such invention may provide alternative and possibly safer, simpler or less costly techniques by which inflator devices can be appropriately filled with desired gas and liquid fluid materials.

Certain limitations or restrictions, however, have or may present obstacles to the greater or more widespread use of and reliance on leak detection and measurement via such radioactive materials. For example, in order to improve either or both the efficiency and accuracy of leak detection and measurement via such radioactive materials, there is a need and a demand for methods or techniques for better ensuring that such leak trace materials and pressure vessel contents form or are otherwise present as a substantially homogeneous mass within a respective pressure vessel chamber which is to be leak checked by the measurement or detection of radioactive signals emanating from such a chamber. In particular, there is a need and a desire for a simple method of preparing or loading such leak trace materials within such pressurized chambers and such as may result or better ensure that the leak trace material and other pressure chamber contents form or are present as such a homogeneous mass.

Further, as disclosed in the above-referenced prior U.S. patent application Ser. No. 08/935,016 a quantity of such radioactive leak trace material can be held by a solid material within a particular pressurized, fluid-containing chamber or vessel of an inflator device. Such solid material may desirably initially hold at least a substantial portion of the radioactive isotope leak trace material contained within the particular chamber or vessel. As disclosed, a large percentage of the leak trace material originally absorbed or held by or in the solid material will over time be gradually released or no longer held thereby and thus permit or allow the detection of the presence of leaks, in accordance with the corresponding leak detection process.

Such a solid material which initially holds at least a substantial portion of the radioactive isotope leak trace material can be of various compositions. For example, many decomposition sensitizer materials can also advantageously serve as such a radioactive isotope leak trace material-holding solid, also commonly referred to as a "getter."

A potential complication or shortcoming relating to the employment of a radioactive isotope leak trace material-holding solid may arise from the period of time required for the leak trace material to release and subsequently pass or diffuse from the "holding" solid into the stored fluid of the particular chamber or vessel. As will be appreciated, should the holding solid not release or allow the leak trace material to pass or diffuse into the stored fluid of the particular chamber or vessel in the proper manner, an erroneous leak detection measurement may result.

Thus, a need and a demand exists for improved methods for introducing a radioactive leak trace material into an apparatus for inflating an inflatable device and such as may reduce, minimize or overcome the potential for erroneous leak detection measurement such as may be associated with a holding solid not releasing or allowing a leak trace material to pass or diffuse into the stored fluid of the particular chamber or vessel in the proper manner.

SUMMARY OF THE INVENTION

A general object of the invention is to provide an improved method of introducing a leak trace material, particularly a radioactive leak trace material, into an apparatus, such as an inflator, for inflating an inflatable device.

A more specific objective of the invention is to overcome one or more of the problems described above.

The general object of the invention can be attained, at least in part, through a specified method of introducing a radioactive leak trace material into an apparatus for inflating an inflatable device. In particular, the apparatus includes a chamber which contains, under pressure, a quantity of at least one gas source material and which gas source material, upon initiation, results in an inflation fluid used to inflate the device.

In accordance with one embodiment of the invention, such a method of introducing a radioactive leak trace material into an apparatus for inflating an inflatable device includes the steps of preparing a mixture which contains a preselected quantity of the radioactive leak trace material and the quantity of the at least one gas source material, and then loading the mixture into the apparatus chamber.

In accordance with one specific embodiment of the invention, such a method of introducing a radioactive leak trace material into an apparatus for inflating an inflatable device includes the step of providing a cryogenically-formed solid mass of a homogeneous mixture which contains a preselected quantity of the radioactive leak trace material and the quantity of the at least one gas source material into the apparatus chamber.

The prior art fails to provide as effective as desired method or technique by which a leak trace material, particularly a radioactive leak trace material, can be introduced into a pressurized fluid-containing device such as used in the inflation of inflatable devices such as inflatable vehicle occupant restraint airbag cushions.

The invention further comprehends a method of introducing $Kr^{85}$ leak trace material into an apparatus for inflating an inflatable device. The apparatus for inflating an inflatable device includes a chamber which contains, under pressure, a quantity of $N_2O$ and which $N_2O$, upon initiation, undergoes dissociation to form products of dissociation including at least one gaseous product of dissociation used to inflate the inflatable device. In accordance with one embodiment of the invention, such a method includes the steps of:
 preparing a homogeneous mixture containing a preselected quantity of $Kr^{85}$ leak trace material and the quantity of $N_2O$, and
 loading the homogeneous mixture into the apparatus chamber.

As used herein, references to "dissociation," "dissociation reactions" and the like are to be understood to refer to the dissociation, splitting, decomposition or fragmentation of a single molecular species into two or more entities.

"Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure change the energy which may be required for the dissociation reaction to be completed, such dissociation reactions remain primarily temperature controlled.

An "exothermic thermal dissociation" is a thermal dissociation which liberates heat.

"Equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi=(F/O)_A/(F/O)_S \quad (1)$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

A "pyrotechnic" material, in its simplest form, consists of an oxidizing agent and a fuel that produce an exothermic, self-sustaining reaction when heated to the ignition temperature thereof.

Other objects and advantages will be apparent to those skilled in the art from the following detailed description taken in conjunction with the appended claims and drawing.

BRIEF DESCRIPTION OF THE DRAWING

The FIGURE is a simplified, partially in section, fragmentary schematic drawing of a vehicle occupant safety apparatus incorporating an airbag inflator assembly in accordance with one embodiment of the invention.

DETAILED DESCRIPTION OF THE INVENTION

The present invention generally relates to the introduction of a leak trace material, particularly a radioactive leak trace material, into an apparatus, such as an inflator and such as used for inflating an inflatable device. As will be appreciated, the invention is capable of being practiced in conjunction with a variety of different structures. As representative, the FIGURE illustrates the present invention as embodied relative to a vehicle safety apparatus, generally designated by the reference numeral 10. The vehicle occupant safety apparatus 10 includes an inflatable vehicle occupant restraint 12, e.g., an inflatable airbag cushion, and an apparatus, generally designated by the reference numeral 14, for inflating the occupant restraint, commonly referred to as an inflator.

The invention is described hereinafter with particular reference to an inflator for use in various automotive vehicles including vans, pick-up trucks, and particularly automobiles. As will be appreciated by those skilled in the art, the invention has applicability to various types or kinds of airbag installations for automotive vehicles including driver side, passenger side and side impact airbag assemblies, for example. Moreover, the invention has applicability with other types of vehicles as well, including airplanes, for example.

The vehicle occupant safety apparatus 10 is similar in many respects to at least certain of the vehicle safety apparatuses shown and described in the above-referenced prior U.S. patent application Ser. No. 08/935,016. With such a vehicle safety apparatus 10, the vehicle occupant restraint 12 is inflated by a flow of an inflation fluid, e.g., gas, from the inflator 14 to restrain movement of an occupant of the vehicle. The inflatable vehicle occupant restraint 12 is inflated into a location within the vehicle between the occupant and certain parts of the vehicle interior, such as the doors, steering wheel, instrument panel or the like, so that the occupant does not forcibly strike such parts of the vehicle interior.

The inflator assembly 14, such as described in the above-referenced prior U.S. patent application Ser. No. 08/935,016, generates inflation gas via a decomposing or, more specifically, a dissociative gas source material. Also, as disclosed in that prior application, the subject inflator assembly additionally contains at least one radioactive isotope leak trace material such as may permit or facilitate the detection of the presence or occurrence of fluid leakage from the assembly or a chamber thereof. The quantities and relative amounts of such radioactive leak trace and gas source materials are generally easily determinable such as in a manner as described in application Ser. No.08/935,016.

As is to be appreciated, the use of such radioactive materials may be subject to certain established or prescribed limitations. For example, such limitations may include one or more of the following:

1) That individual inflators do not contain radioactive material in harmful amounts;
2) The radiation release associated with the release or escape of all or a portion of the stored fluid is not harmful; and
3) The additive radiation effects of such an inflator is not harmful such as when, for example, a plurality of such inflators are concentrated in a relatively small area.

The present invention, as described in greater detail below, provides an improved technique and method for the introduction of such radioactive isotope leak trace material within such inflator assemblies. More specifically, such technique and method generally involves the loading of a mixture containing a preselected quantity of the radioactive leak trace material and a quantity of at least one gas source material, which upon initiation results in an inflation fluid used to inflate the device, into a chamber wherein the at least one gas source material is maintained under pressure.

As detailed in prior patent application Ser. No. 08/935, 016, several methods of leak detection utilizing a radioactive tracer have been envisioned with the amount or quantity of the radioactive isotope required to be added to a particular vessel being tested correspondingly determined. While reference can be made to prior patent application Ser. No. 08/935,016 for a more detailed discussion, in brief, these methods include:

Method 1

In this method, a specified quantity of the selected radioactive isotope is directly loaded into the inflator pressure vessel being leak checked. After a selected period of time has elapsed, the vessel is checked for radioactive material content by measuring the gamma ray signal external to the component and, if desired, such as in order to determine if there is a direct leak of gas from the vessel, by a measurement of beta particle output. The measured gamma ray signal is then related to the content of stored pressurized fluid in the vessel. The initial and remaining quantities or contents of the radioactive material can then be compared against a predefined limit whereby the acceptability of the leak rate of the vessel can be assessed.

Method 2

This method is generally similar to the above method 1 except that there is no need for an initial radioactivity reading.

Method 3

This method is generally similar to that of Method 1, described above, with the additional provision of a quantity of the radioactive tracer material to allow for the radioactive decay of the radioactive tracer over the vessel component lifetime, e.g., 15 years.

In a basic form, this method can be stated as follows: the pressure vessel is filled with a quantity of radioactive tracer material such that, for the expected lifetime of the device (given a specified maximum leak rate of gas therefrom), a sufficient quantity of the radioactive material remains that the quantity of the radioactive material within the vessel and rate of leakage of the radioactive material from the vessel can be measured.

As will be appreciated, the amount or concentration of radioactive leak trace material desired for inclusion within a particular storage chamber or vessel is generally governed by a complex relationship of various, oftentimes interrelated factors including, for example, the extent of radioactive signal attenuation such as due to the thickness of the vessel walls, the efficiency of the detection apparatus and the period of time required or available for leak rate detection. In practice, expected and designed for internal operating pressures within an inflator generally dictate the pressure vessel wall thickness, available technology may limit the efficiency of the detection apparatus and the period of time required for detection desirably is minimized or reduced to the extent possible.

Given these considerations, the following general guidelines are provided regarding the concentration of radioactive leak trace material gas (i.e., $Kr^{85}$) within an inflator chamber fluid. More specifically, a $Kr^{85}$ radioactive gas concentration (grams of $Kr^{85}$ per cubic centimeter of chamber fluid) of about $1 \times 10^{-13}$ to about $1 \times 10^{-7}$, preferably about $1 \times 10^{-13}$ to about $1 \times 10^{-9}$ and, more preferably, about $1 \times 10^{-13}$ to about $1 \times 10-11$ is generally needed or desired for the leak checking of a representative passenger side inflator, in accordance with the invention. As will be appreciated, operation outside such concentration ranges may be desired or required for particular inflator assemblies and improvements in detection technology may desirably permit operation and use with reduced concentrations of radioactive leak trace material.

Returning to the FIGURE, the inflator assembly 14 comprises a chamber 16 that is filled and pressurized with one or more inert gases such as argon or nitrogen, preferably mixed with gaseous helium to facilitate leak checking of the chamber such as in a manner well known in the art. The chamber 16 is sometimes referred to herein as a "gas storage chamber." In practice, such a chamber is typically filled to a pressure in the range of 2000–5000 psi (13.8–34.5 MPa).

The chamber 16 is defined by an elongated generally cylindrical sleeve 18. The sleeve includes a fill port 19, as is known in the art, wherethrough materials can be passed into the chamber 16. After the gas storage chamber 16 has been filled, the fill port 19 can be appropriately blocked or plugged, as is known, such as by a pin or ball 19a.

The sleeve 18 has a first end 20 and a second end 22. The first end 20 is closed by a diffuser assembly 26 joined or attached thereto in an appropriate manner, such as by an inertial weld 27. The diffuser assembly 26 includes a rupturable base wall 28. In the illustrated embodiment, the rupturable base wall 28 includes an opening 30 normally closed by means of a burst disc 32 or the like. It will be appreciated that other forms of a rupturable wall such as a wall having an appropriately scored surface or thinned region, for example, can, if desired, be used. The diffuser assembly 26 also includes a plurality of openings 34, wherethrough the inflation gas from the inflator assembly 14 is properly dispensed into the occupant restraint 12. Thus, the diffuser assembly 26 can serve to facilitate direction of the inflation fluid from the inflator assembly 14 into the associated inflatable vehicle occupant restraint 12.

The sleeve second end 22 is partially closed by a rupturable end wall 36. As with the rupturable base wall 28 described above, the rupturable end wall 36 in the illustrated embodiment includes an opening 40 normally closed by means of a burst disc 42 or the like. It will also be appreciated that other forms of a rupturable wall such as a wall having an appropriately scored surface or thinned region, for example, can, if desired, be used.

The sleeve second end 22 includes a collar portion 44. A chamber base portion 46 is joined or attached to the sleeve collar portion 44 in an appropriate manner, such as by an inertial weld 50, to form a chamber 52. The chamber 52 contains, as described in greater detail below, at least one gas source material which undergoes dissociation to form products of dissociation including at least one gaseous product of dissociation used to inflate the vehicle occupant restraint 12. Thus, the chamber 52 is sometimes referred to herein as a "dissociation chamber."

The base portion 46 includes an opening 54 therein, wherethrough an initiator device 56 is attached in sealing relation, such as with a weld, crimping or other suitable hermetic seal, within the dissociation chamber 52.

In such an assembly, the initiator device can include any suitable type of initiator means including: bridgewire, sparkdischarge, heated or exploding wire or foil, through bulkhead (e.g., an initiator which discharges through a bulkhead such as in the form of a metal hermetic seal), for example, and may, if desired, optionally contain a desired load of a pyrotechnic initiator charge. In practice, however, a relatively large heat input such as from the initiator, may be helpful in obtaining a more thorough initiation of the dissociation of various gas source materials, such as nitrous oxide ($N_2O$). In view thereof, as pyrotechnic chargecontaining initiators can typically more easily produce, such relatively large heat inputs from a relatively small sized initiator device, the practice of the invention with such initiators can be particularly advantageous.

One of the collar portion 44 and the dissociation chamber base portion 46, in the illustrated embodiment the base portion 46 in a base wall 60 thereof, includes a fill port 62, as is known in the art, wherethrough materials can be passed into the dissociation chamber 52. After the dissociation chamber 52 has been filled, the fill port 62 can be appropriately blocked or plugged, as is known, such as by a pin or ball 62a.

As identified above, the dissociation chamber 52 contains at least one gas source material which, in accordance with at least certain preferred embodiments of the invention, may desirably take the form of a material which undergoes a dissociative or decompositional reaction, preferably an exothermic such reaction, to form gaseous products such as used to inflate the associated airbag cushion.

As disclosed in Rink, U.S. Pat. No. 5,669,629, a wide variety of gas source materials which undergo dissociative or decompositional reactions, preferably an exothermic such reaction, to form gaseous products are available. Such gas source materials include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

Generally, dissociative gas source materials used in the practice of the invention are preferably:

a.) non-toxic and non-corrosive both in the pre- and post-dissociation states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the dissociation reaction, and which catalysts may be difficult to remove or handle; and d.) form products of dissociation which do not contain undesirable levels of undesirable species, such as carbonaceous material (e.g., soot), $CO_x$ and $N_x$ (where x=1 or 2), and $NH_3$, for example.

A currently preferred dissociative gas source material for use in the practice of the invention is nitrous oxide ($N_2O$). Nitrous oxide is advantageously generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. Oh more. As a result, nitrous oxide is desirably relatively safe to handle, thermally stable, facilitates storage, and alleviates manufacturing concerns. Further, in accordance with the chemical reaction (2) identified below, upon the dissociation of nitrous oxide, the dissociation products ideally are nitrogen and oxygen:

$$2N_2O = 2N_2 + O_2 \qquad (2)$$

Thus, not only does such reaction form products which are generally non-toxic and non-corrosive but also results in the production or formation of molecular oxygen, such as may be desired with certain inflator designs.

It is to be understood that such dissociative gas source material can, for example and as desired, be stored in a gaseous, liquid or multi-phase form (i.e., partially gaseous and partially liquid mixture). It is to be appreciated that the storage of such gas source materials in a liquid form can advantageously reduce the storage volume required and hence the size, weight and typically the costs associated with such assemblies. While such liquid phase storage can undesirably complicate or impede helium leak detection techniques, as described in the above-referenced application Ser. No. 08/935,016, leak detection via a radioactive leak trace material can avoid or minimize such problems or concerns.

Alternatively or in addition, an inert gas, such as argon and helium, for example, or mixture of such inert gases, can be included to supplement the gas produced or formed upon the dissociation of the dissociative gas source material.

While the invention is, as described above, generally applicable to various types or kinds of airbag installations for including driver side, passenger side and side impact airbag assemblies, for example, the present invention is described in further detail in connection with the sample load values provided in TABLE 1, below, which are provided to illustrate the use of the subject invention in connection with an inflator device for a typical side impact inflation system application. These sample load values are those that are currently deemed necessary or appropriate for proper operation of a sample such device and are provided to more fully illustrate the subject invention and the practice thereof. It is to be understood that these values are not necessarily to be construed as absolute values and that the broader practice of the invention is not limited to operation within these values.

In accordance with the invention, one such an inflator assembly having a typical size of: diameter=25 mm, length= 150 mm, for use in association with a side impact airbag cushion is desirably loaded as detailed in TABLE 1, below:

TABLE 1

| | Chamber | |
| --- | --- | --- |
| | Gas Storage - "16" | Dissociation - "52" |
| volume (in$^3$) | 1.5 | 0.65 |
| volume (cc) | 24.6 | 10.7 |
| pressure (psi) | 4000 | 2100 |
| pressure (MPa) | 27.6 | 14.5 |
| contents (molar %) | 90% Ar and 10% He | 60% N$_2$O and 40% He |
| contents mass (grams) | 10 | 2.2 |

In addition, the dissociation chamber 52 contains an optional storage volume 64 which contains a sensitizer material, generally designated by the reference numeral 66, to promote or accelerate the rate of such dissociative reaction. Various sensitizer materials are disclosed and identified in above-identified Rink, U.S. Pat. No. 5,669,629. As disclosed therein, sensitizer materials are typically hydrogen-bearing materials and are generally added to the dissociative gas source material in relatively small amounts. Specifically, the sensitizer material is preferably added to the dissociative gas source material in an amount below the flammability limits for the content mix, such that the contents of the dissociative chamber are generally at an equivalence ratio of less than 0.25, preferably less than 0.15. At such low relative amounts, the chamber contents are essentially non-flammable and thus combustion and the formation of combustion products are practically avoided.

Hydrogen-bearing sensitizer materials useable in the practice of the invention are typically gaseous, liquid, solid, or multi-phase combinations thereof including hydrogen, hydrocarbons, hydrocarbon derivatives and cellulosic materials. Preferred hydrocarbon hydrogen-bearing sensitizer materials useable in the practice of the invention include paraffins, olefins, cycloparaffins and alcohols. Molecular hydrogen (H$_2$), which does not result in the formation of carbon oxides such as carbon monoxide or carbon dioxide, has been found to be quite effective as a sensitizer and is an especially preferred hydrogen-bearing sensitizer material for use in the practice of the invention.

As disclosed in the above-referenced prior U.S. patent application Ser. No. 08/935,016, various radioactive leak trace materials can be used. The radioactive isotope Kr$^{85}$ has found previous extensive use as a leak trace material. As a result, a vast quantity of commercial and practical experience has been accumulated in connection regarding such use of the radioactive isotope Kr$^{85}$. In view of such previous use and experience, the radioactive isotope Kr$^{85}$ is believed to be a preferred leak trace material for use in the practice of the invention.

In accordance with the invention, such radioactive leak trace material can conveniently and efficiently be introduced into the inflator apparatus 14, specifically the dissociation chamber 52, by preparing a mixture containing a preselected quantity of the radioactive leak trace material and the quantity of gas source material and then loading such mixture into the apparatus chamber 52.

Preferably, the radioactive leak trace material and the gas source material are miscible with the radioactive leak trace material and the gas source material mixture prepared to include a uniform concentration of the radioactive leak trace material.

As will be appreciated, such mixture preparation may generally involve mixing the selected radioactive leak trace material, such as in a gaseous form, with the selected gas source material, such as in either gaseous or liquid form.

The process of loading such a mixture can be accomplished by various techniques such as are known in the art for loading gases, liquids and/or solids. Useful techniques for loading such mixtures in accordance with the invention may include: direct gas injection of the mixture into the chamber, liquid injection of the mixture into the chamber or loading a cryogenically formed solid mass of mixture, for example. In each such case, the chamber is desirably sealed closed after such loading.

For example, the direct gas and liquid injection techniques may utilize a fill port, such as the fill port 62 in the above-described embodiment, by which to introduce such gaseous or liquid mixture, with the fill port subsequently being appropriately blocked or plugged, such as by a pin or ball 62a, as described above.

With respect to a cryogenically formed solid mass of mixture, the particular or specific method or technique of preparing such cryogenically formed or frozen solid masses is not an aspect of the subject invention and those skilled in the art will appreciate that various suitable methods or techniques are available. For example, if desired, the cryogenic or frozen quantities of such a mixture, such as composed of nitrous oxide with the radioactive leak trace material, e.g., the radioactive isotope Kr$^{85}$, contained therein such as in a gaseous, liquid or solid form, can be formed by pumping a corresponding fluid mixture into a closed mold and then submerging the mold in a bath of liquid nitrogen, thereby freezing the nitrous oxide with the radioactive isotope therein contained. The frozen mixture subsequently melts such as to form a gas, liquid or multi-phase mix containing the gas source and leak trace materials.

As will be appreciated, various techniques can, as desired and appropriate, be utilized for the loading of such a cryogenically formed solid mass of mixture. For example, during the assembly of a particular inflator apparatus such as the inflator apparatus 14, described above, such a solid mass can be placed between the sleeve collar portion 44 and the chamber base portion 46 with the portions 44 and 46 being subsequently joined or attached such as in a manner as described above.

Further, employing a cryogenically formed solid mass of mixture in the manner described above may avoid the need for the inclusion of a fill port, such as the fill port 62 in the above-described embodiment. The elimination of a fill port and an associated blocking or plugging pin or ball desirably simplifies the assembly such as by reducing or minimizing potential or possible leak paths from the pressurized assembly.

Operation

The normal operation of the vehicle occupant safety apparatus 10 is as follows:

Upon the sensing of a collision, an electrical signal is sent to the initiator device 56. The initiator device 56 functions and, when it is a pyrotechnic charge-containing initiator, discharges high temperature combustion products into the dissociation chamber 52 and the contents thereof, which in one embodiment includes gaseous phase $N_2O$. The large heat addition results in commencement of the thermal dissociation of the $N_2O$. In this thermal dissociation, the $N_2O$ begins to break down into smaller molecular fragments. As the $N_2O$ molecules fragment, the associated release of energy results in further heating of the remaining mixture. The increase both in temperature and the relative amount of gaseous products within the dissociation chamber 52 results in a rapid pressure rise in the dissociation chamber.

When the gas pressure within the dissociation chamber 52 exceeds the structural capability of the burst disc 42, the disc 42 ruptures or otherwise permits the passage of the hot products of dissociation into the gas storage chamber 16. Wherein, the hot product gas of dissociation expelled from the dissociation chamber 52 mixes with the pressurized gas stored within the gas storage chamber 16 to produce inflation gas for use in inflating the inflatable restraint device 12. It will be appreciated that augmenting the product gas of dissociation with the stored inert gas, in addition to diluting the products of dissociation, may also serve to produce an inflation gas having a lower temperature than the dissociation product gas alone.

When the gas pressure within the storage chamber 16 exceeds the structural capability of the burst disc 32, the disc 32 ruptures or otherwise permits the passage of the inflation gas through the diffuser assembly 26 and out the diffuser outlet openings 34 into the inflatable vehicle occupant restraint 12.

While the invention has been described above relative to a vehicle occupant safety apparatus wherein the inflator normally contains a dissociative gas source material under pressure within a chamber, it will be appreciated that the broader practice of the invention is not so limited. The invention can, if desired, be practiced in conjunction with other pressurized gas source materials such as pressurized gases such as pressurized inert gases such as argon, for example. Thus, the method of the invention for introducing a leak trace material into the inflator apparatus can, if desired, be employed relative to the gas storage chamber, i.e., designated by the reference numeral 16, either alternatively or in addition to the dissociation chamber, 52. As will be appreciated, employing the method of the invention for introducing a leak trace material into both the dissociation chamber 52 and the gas storage chamber 16 may avoid the need to include or employ fill ports while providing a long term leak detection capability. Thus, the invention may more readily result in or provide an inflator or associated assembly which has or results in improved reliability.

Also, while the invention has been described above relative to an inflator having two pressurized chambers, the broad practice of the invention is not necessarily so limited. For example, if desired, the invention can be practiced or employed in conjunction with an inflator apparatus having only a single pressurized chamber such as a stored gas chamber or a dissociation chamber. Further, the invention can be practiced or employed relative to an inflator apparatus having more than two pressurized chambers and in conjunction with 1, 2 or more, or all of such chambers, as may be desired.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of introducing a radioactive leak trace material into an apparatus for inflating an inflatable device wherein the apparatus includes a chamber which contains, under pressure, a quantity of at least one gas source material and which gas source material, upon initiation, results in an inflation fluid used to inflate the device, said method comprising the steps of:
   preparing a mixture which contains a preselected quantity of the radioactive leak trace material and the quantity of the at least one gas source material, and
   loading the mixture into the apparatus chamber.

2. The method of claim 1 wherein the radioactive leak trace material is the radioactive isotope $Kr^{85}$.

3. The method of claim 1 wherein the gas source material is $N_2O$.

4. The method of claim 1 wherein the radioactive leak trace material and the gas source material are miscible.

5. The method of claim 1 wherein the mixture is prepared to include a uniform concentration of the radioactive leak trace material.

6. The method of claim 1 wherein, prior to said loading step, the mixture is cryogenically treated to form a solid mass of the mixture.

7. The method of claim 6 wherein said loading step comprises placing the cryogenically-formed solid mass of the mixture into the apparatus chamber.

8. The method of claim 1 wherein said mixture preparation step comprises mixing a gaseous radioactive leak trace material with a gaseous gas source material.

9. The method of claim 1 wherein said mixture preparation step comprises mixing the gas source material in liquid form with the radioactive leak trace material.

10. The method of claim 1 wherein said loading step comprises direct gas injection of the mixture into the apparatus chamber.

11. The method of claim 1 wherein said loading step comprises injection of a liquid mixture into the apparatus chamber.

12. A method of introducing $Kr^{85}$ leak trace material into an apparatus for inflating an inflatable device wherein the apparatus includes a chamber which contains, under pressure, a quantity of $N_2O$ and which $N_2O$, upon initiation, undergoes dissociation to form products of dissociation including at least one gaseous product of dissociation used to inflate the inflatable device, said method comprising the steps of:

preparing a homogeneous mixture containing a preselected quantity of $Kr^{85}$ leak trace material and the quantity of $N_2O$, and loading the homogeneous mixture into the apparatus chamber.

13. The method of claim 12 wherein, prior to said loading step, the homogeneous mixture is cryogenically treated to form a solid mass of the mixture.

14. The method of claim 13 wherein said loading step comprises placing the cryogenically-formed solid mass of the mixture into the apparatus chamber.

15. The method of claim 12 wherein said mixture preparation step comprises mixing gaseous $Kr^{85}$ with gaseous $N_2O$.

16. The method of claim 12 wherein said mixture preparation step comprises mixing $N_2O$ in liquid form with the $Kr^{85}$.

17. The method of claim 12 wherein said loading step comprises direct gas injection of the homogeneous mixture into the apparatus chamber.

18. The method of claim 12 wherein said loading step comprises injection of a liquid mixture into the apparatus chamber.

19. A method of introducing a radioactive leak trace material into an apparatus for inflating an inflatable device wherein the apparatus includes a chamber which contains, under pressure, a quantity of at least one gas source material and which gas source material, upon initiation, results in an inflation fluid used to inflate the device, said method comprising the step of:

providing a cryogenically-formed solid mass of a homogeneous mixture which contains a preselected quantity of the radioactive leak trace material and the quantity of the at least one gas source material into the apparatus chamber.

20. The method of claim 19 wherein the radioactive leak trace material is the radioactive isotope $Kr^{85}$.

21. The method of claim 19 wherein the gas source material is $N_2O$.

* * * * *